United States Patent [19]

Olson, Jr.

[11] Patent Number: 4,690,249
[45] Date of Patent: Sep. 1, 1987

[54] PRECISELY RECURRENTLY CONTROLLABLE DROPWISE LIQUID-FEEDERS

[76] Inventor: Theodore D. Olson, Jr., R.R. #4, Atkinson, Nebr. 68713

[21] Appl. No.: 865,003

[22] Filed: May 20, 1986

[51] Int. Cl.[4] ............................................. F16N 29/04
[52] U.S. Cl. ...................................... 184/6.4; 184/67; 184/79; 73/861.41
[58] Field of Search ..................... 184/6.1, 6.4, 65, 66, 184/67, 79, 108; 604/251, 253; 73/861.41

[56] References Cited

U.S. PATENT DOCUMENTS

| | | | |
|---|---|---|---|
| 1,574,410 | 2/1926 | Powell | 184/6.1 |
| 3,604,419 | 9/1971 | Haifa et al. | 604/253 |
| 4,038,982 | 8/1977 | Burke et al. | 604/65 |
| 4,383,252 | 5/1983 | Purcell et al. | 604/31 |

*Primary Examiner*—Leonard E. Smith
*Attorney, Agent, or Firm*—George R. Nimmer

[57] ABSTRACT

Precisely recurrently controllable dropwise oilers or other liquid-feeds for apparatus having some optimal-requirement of oil or other liquid-feed to be supplied gravitationally dropwise from an outlet-line emanating from a lofty reservoir. A solenoid actuatable reciprocatable plunger-valve effects intermittent liquid-feed flow along the outlet-line toward a liquid drop-former element spaced a vertical-gap above an apparatus intake-line. For recurring like time-periods, infrared or other electromagnetic detector detects liquid-feed droplets falling from the drop-former so that the liquid-feeder operator might during recurring like time-periods have the solenoid reciprocation adjusted toward the achievement of a dropwise liquid-feed rate tending to converge upon the apparatus optimal-requirement.

8 Claims, 4 Drawing Figures

FIG. 1 (PRIOR ART)
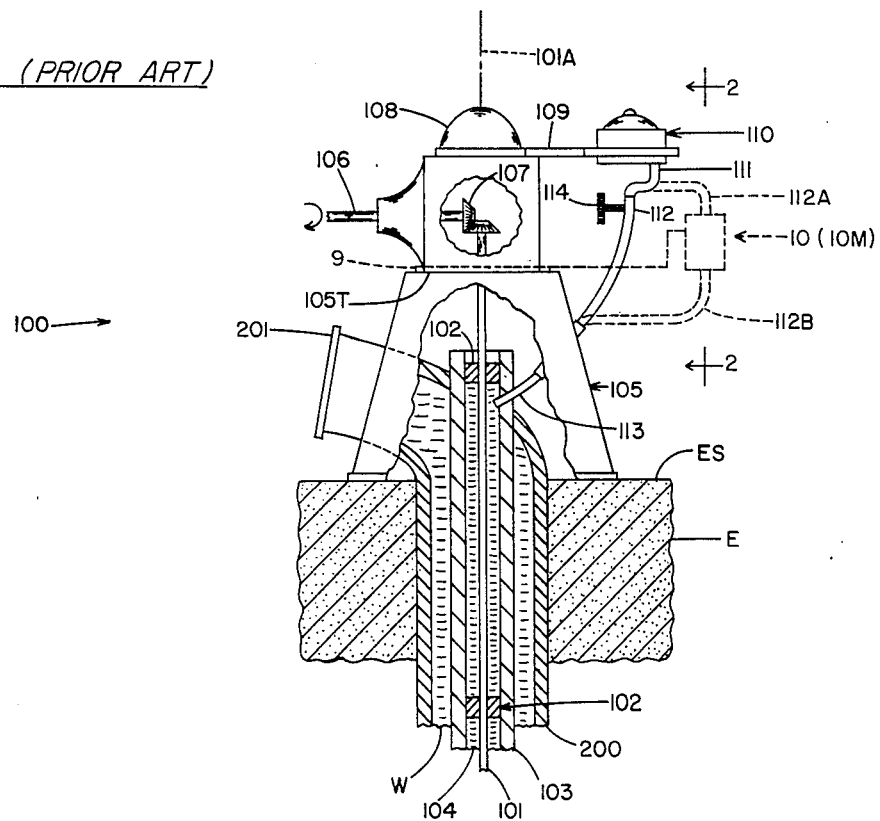
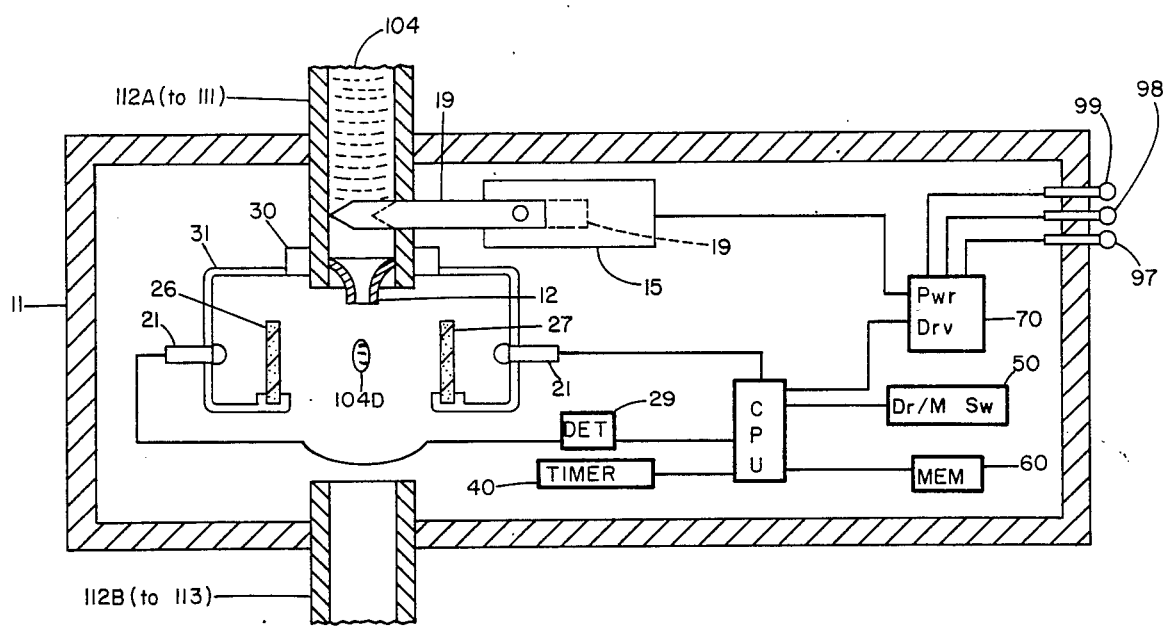
FIG. 3

PRECISELY RECURRENTLY CONTROLLABLE DROPWISE LIQUID-FEEDERS

BACKGROUND OF THE INVENTION

For machineries equipped with rotatable bearings immersed within lubrication oil, the oil needs to be regularly replenished (e.g. through regular gravitational feeding) at an optimal-drops/minute from a relatively lofty reservoir of oil. In the latter regard, a relatively lofty outlet-line conveys the oil from the reservoir to an intake-line communicating with the machinery's rotatable bearings. The optimal-drops/minute is empirically calculated according to a given machine's optimal-requirement for oil per unit time.

In the prior art, the quest for gravitational feeding of oil at the optimal-drops/minute is pursued by utilizing a manually adjustable threaded needle-valve (e.g. 114) positioned along the tubular outlet-line, and this is reliable only so long as the oil viscosity remains substantially constant. Accordingly, such commonly utilized manually adjustable threaded needle-valves cannot be blindly relied upon if the oil viscosity changes, such as effected by: water condensation, sludge or other transient oil impurity, ambient temperature changes, etc.

A representative type such machinery having immersed bearings requiring regular oil replenishment by gravitational means and utilizing such prior art manually adjustable threaded needle-valves (e.g. 114), is the water pump machinery depicted in drawing FIG. 1. Machinery embodiment 100 is employed for pumping subterranean water "W" upwardly along a well-casing 200 surrounding vertical-axis 101A and upwardly terminating as a lateral-spout 201. Well-casing 200 surrounds tubular oil-casing 103 and which in turn surrounds drive-shaft 101 extending along vertical-axis 101A. Upwardly pumped water "W" occupies the annular space between well-casing 200 and oil-casing 103, and lubrication oil 104 occupies the annular space between oil-casing 103 and drive-shaft 101. Thus, the incrementally spaced bearings 102 of drive-shaft 101 and which bear against oil-casing 103, are immersed within lubrication oil 104. Pumping machinery 100 also comprises a hollow pedestal 105 resting upon the earth's surface "ES" and surrounding the upper terminii of oil-casing 103 and drive-shaft 101. Motive power to drive-shaft 101 is supplied via rotatable lateral-shaft 106 and gearing 107 located loftily above earth "E". Thus, as lateral-shaft 106 is powerably rotated (e.g. gasoline engine, etc.), drive-shaft 101 is also rotated and whereby its subterranean helices (not shown) cause subterranean water "W" to be pump upwardly between well-casing 200 and oil-casing 103.

For pumping apparatus 100, lubrication oil 104 is constantly replenished from a reservoir 110 of oil mounted (e.g. 109) to pedestal part 108. This reserved oil gravitationally flows through an outlet-line 111 ultimately communicating (113) with the annular space between drive-shaft 101 and oil-casing 103. At the outlet-line portion 112, the prior art utilizes a threaded needle-valve (e.g. 114) that is empirically manually established at a threaded setting which hopefully will replenish oil 104 at the optimum-drops/minute. But, as previously mentioned. such needle-valve threaded setting cannot be indefinitely relied upon if the oil (104) viscosity changes.

OBJECT OF THE INVENTION

It is accordingly the general objective of the present invention to provide an unusually precisely recurrently controllable dropwise liquid-feeder for apparatus having an optimal-requirement (expressed in optimal-drops/minute) of liquid-feed to be gravitationally fed into said apparatus through an intake-line and that eschews usage of needle-valves. In a related vein, general objectives include providing an unusually precisely recurrently controllable dropwise oiler for machinery having an optimal-requirement (expressed in optimal-drops/minute) of oil to be gravitationally fed into such machinery through an intake-line and that eschews reliance upon a manually settable needle-valve.

GENERAL STATEMENT OF THE INVENTION

With the above general objectives in veiw, and together with more specific and ancillary objectives which will become more apparent as this description proceeds, the precisely recurrently controllable dropwise liquid-feeder (e.g. oiler) generally comprises: a reservoir for oil and an outlet-line therefor and both being located loftily above a machinery oil intake-line, the outlet-line including an outlet-length communicating with a drop-former located in alignment above the intake-line, and the outlet-length being provided with a reciprocatable plunger-valve actuatably connected to a solenoid; a timer of the type aribrarily settable to registerably announce recurring time-periods expressed as seconds/drop for said optimal-requirement; solenoid control means for selectively varying at least the duration that the plunger-valve permits oil to flow along the outlet-length to the drop-former; electromagnetic detection means for detecting the presence of each oil droplet falling from the drop-former; and desireably also, compensator means for comparing the actual-drops/minute achieved during every recurring time-period and for varying the solenoid control means to be utilized for the next time period, whereby the actual-drops/minute achieved for subsequent time periods tends to converge in value toward the optimal-drops/-minute.

GENERAL DESCRIPTION OF THE DRAWING

In the drawing, wherein like characters refer to like parts in the several views, and in which:

FIG. 1 aforedescribed in an elevational view, partly in section, of prior art water pump machinery 100 having an optimalrequirement of oil to be gravitationally fed thereinto. Phantom lines represent the present invention, namely a controlled dropwise oiler (e.g. 10, 10M) replacing the prior art needle-valve (114);

FIG. 3 is a sectional elevational view similar to FIG. 2 and showing a more sophisticated controllable dropwise oiler as embodiment 10M.

DETAILED DESCRIPTION OF THE DRAWING

As already mentioned in connection with FIG. 1, solid line portions thereof exist in the prior art but phantom line portions thereof are directed to the present invention, namely: a precisely recurrently controllable dropwise liquid-feeder (e.g. 10, 10M) that replaces the unreliable manual needle-valve (114) of the prior art. Specifically, such liquid-feeder or oiler completely bypasses the needle-valve 114 by virtue of outlet-line outlet-length 112A and inlet-length 112B that together replace prior-art outlet-length 112. As will be seen, these bypass lengths 112A and 112B extend into the housing 11 and are disposed at vertically separated, but gravitationally aligned locations.

Figure 2:
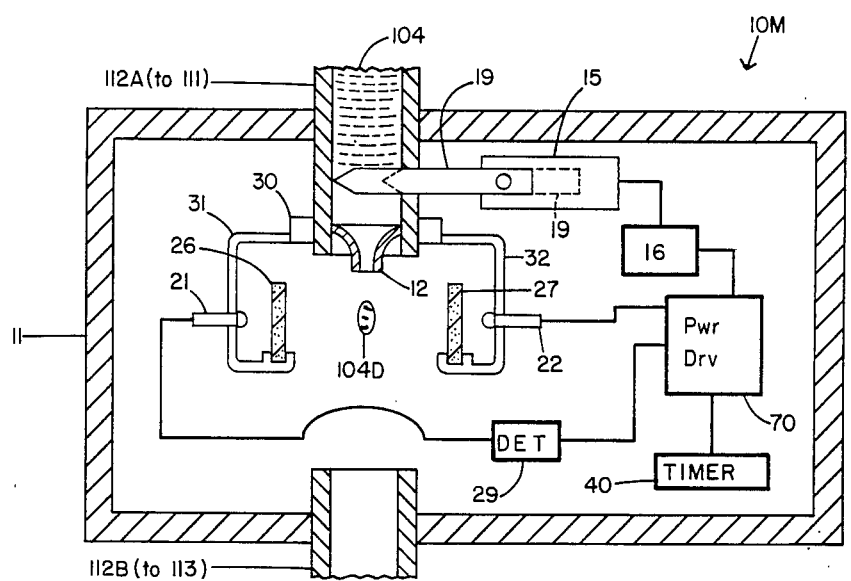
FIG. 2 is a sectional elevational view of the phantom lines inventive portion of FIG. 1, taken along line 2—2 of FIG. 1 and showing a rudimentary controllable dropwise oiler as embodiment 10.

Referring now to drawing FIG. 2 for oiler embodiment 10, it is seen that a drop-former nipple is located immediately above the outlet-end of outlet-length 112A. Immediately above nipple 12, the outlet-length is sidewardly penetrated by a horizontally reciprocatable plunger-valve 19 that is horizontally reciprocatably motivated by an electrical solenoid 15. Thus, as indicated by phantom line, for each brief reciprocation of plunger-valve 19, a small amount of oil 104 is permitted to flow gravitationally downwardly past plungervalve 19 and is formed at nipple 12 into a falling drop of oil 104D. In this wise, depending upon the frequency of plunger-valve reciprocation, an actual-drops/minute oil flow in the form of falling drops (104D) is achievable for a given time-period.

Attached to outlet-length 112A is a fixture 30 extending as bifurcations 31 and 32 located on horizontally separated sides of said vertical-gap between dropformer 12 and inlet-length 112B. The fixture arms 31 and 32 respectively support a transmitter (e.g. 21) and a receiver (e.g. 22) of a selectable electromagnetic spectrum, and desireably also at least one filtering device (e.g. 26, 27) for the selected spectrum. For example, with an oil liquid-feed, fixture leftward arm 31 might support infrared transmitter 21 and filter 26 for such transmitted infrared spectrum, and fixture rightward arm 32 might support infrared receiver 22 and another filter 27 for said transmitted infrared spectrum.

Other salient components for the precisely controllable dropwise oiler embodiment 10 include; and electrical power source 70; swtich 16 for actuating solenoid 15 to reciprocate plunger-valve 19; detector 29 for electronically detecting the presence of each said falling oil droplet 104D; and a timer 40 of the type arbitrarily settable to announce or otherwise register recurring like time-periods.

Operation of the controlled dropwise oiler rudimentary embodiment 10 is as follows. At the outset, the operator is already apprised of the machine's (e.g. 100) own optimal-requirement (and expressed in optimal-drops/minute) of oil to be gravitationally fed into the machine's oil intake-line (e.g. 113). Accordingly, the operator sets conventional TIMER (40) to register recurring timeperiods corresponding to a reciprocal value of the optimal-drops/minute i.e. expressed in seconds/-drop. So, whenever an oil drop 104D is formed and falls during this set time-period, its presence is detected "DET" by the cooperation of infrared-transmitter 21 with infrared-receiver 22. Having attained this information at each time-period, and being able to compare same to the machine's optimal-requirement, sufficient operational intelligence and directive is furnished during each subsequent recurring time-period. Accordingly, for each subsequent recurring time-period, such previously furnished operational intelligence and direction can be appropriately utilized to correctly modify the plunger-valve reciprocation (e.g. duration, stroke-length, etc.), whereby the actual-drops/minute achieved for subsequent time-periods tends to converge in value toward said optimal-drops/minute.

Figure 4:
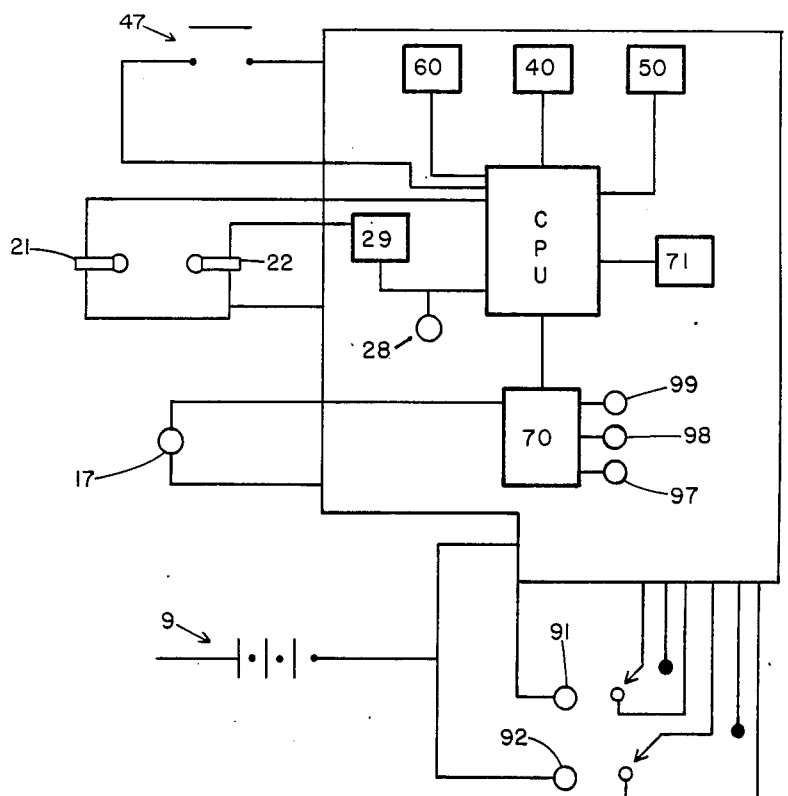
FIG. 4 is a schematic electrical circuit diagram for the controllable dropwise oiler embodiment 10M of FIG. 3.

The more sophisticated dropwise oiler embodiment 10M of FIGS. 3 and 4 has additional structural features, whereby embodiment 10M is less encumbered with the need for constant operator surveillance and intervention. As indicated in FIG. 3, the more prominent of these additional structural features includes a computer processor unit "CPU" electronically tied to: a computer memory 60; a said recurrently registering timer 40; a said detector 29 and said electromagnetic sensors 21-22; a said power driver source 70; and a drops/minute selector switch 50. Status indicator lights (97, 98, 99), which can be tied to various alarms, are also controlled by the "CPU" program.

The aforementioned sophisticated embodiment 10M has a fully automated capability including, inter alia, compensator means for changes in the liquid-feed (e.g. oil) viscosity. For example, if the viscosity changes, because of temperature change or any other viscosity effector, the "CPU" unit will compare the actual-drops/minute achieved during the preceeding time-period with the optimal-drops/minute and will vary the solenoid control to be utilized for the next like timeperiod; accordingly, the actual-drops/minute achieved for next timeperiods will tend to converge in value toward the desired optimal-drops/minute. Moreover, if the reservoir (110) empties or its outlet-line (112) plugs, the "CPU" actuates an appropriate said alarm and, if necessary, will abruptly shut-down system 10M.

The fully automated capability of embodiment 10M is more specifically explained in the FIG. 4 schematic electrical circuit diagram. In addition to the components previously described in connection with FIG. 3, FIG. 4 also refers to the following ancillary components:

(a) a direct current (e.g. 12-volts) input (9);
(b) a power-on reset circuit (71);
(c) a solenoid eliminator valve (17);
(d) a drop indicator light (28);
(e) an alarm relay (91) and to provide warning when no oil is proceeding through the system;
(f) a safety relay (92) to shut-down the system in the event the warning (91) is not heeded after some time (e.g. ½-hour); and
(g) a pre-oil switch (47).

From the foregoing, the construction and operation of the precisely recurrently controllable dropwise liquid-feeds concept of the present invention will be readily understood and further explanation is believed to be unnecessary. However, since numerous modifications and changes will readily occur to those skilled in the art, it is not desired to limit the invention to the exact constructions shown and described, and accordingly, all suitable modifications and changes, and equivalents, may be resorted to, falling within the scope of the appended claims.

What is claimed is as follows:

1. Precisely recurrently controllable dropwise oiler for machinery having an optimal-requirement expressed in optimal-drops/minute of oil to be gravitationally fed into said machinery through an oil intake-line, said controlled dropwise oiler comprising:

(A) a reservoir for oil and an outlet-line therefor and both being disposed at an elevation loftier than for said machinery intake-line, said outlet-line having a lower outlet-length portion including an outlet-end communicating with a drop-former located above and in gravitational alignment with said machinery intake-line, there being a finite vertical-gap between said drop-former and said intake-line, and said outlet-length above said drop-former being provided with a reciprocatable plunger-valve;

(B) a timer of the type arbitrarily settable to register recurring time-periods expressed as seconds/drop for said optimal-requirement;

(C) a solenoid actuatably connected to said reciprocatable plunger-valve;

(D) solenoid control means for selectively varying at least the duration that said plunger-valve permits oil to flow along said outlet-length and to said drop-former during each recurring time-period, whereby an actual-drops/minute oil flow in the form of oil falling dropwise from said drop-former is achieveable for each time-period; and (E) detection means for electronically detecting the presence of each said falling oil droplet.

2. The controllable oiler of claim 1 wherein the electronic detection means comprises a transmitter and a receiver of a selectable electromagnetic spectrum and having constant elevations and extending across the said vertical-gap.

3. The controllable oiler of claim 2 wherein at least one filtering device for a said selected electromagnetic spectrum intervenes between the said transmitter and receiver.

4. The controllable oiler of claim 2 wherein the transmitter is an infrared-transmitter and the receiver is an infrared-receiver.

5. The controllable oiler of claim 4 wherein the infrared-transmitter, the infrared-receiver, and an infrared filtering device are all attached to and extend below a constant elevation said outlet-line.

6. The controllable oiler of claim 1 wherein there are compensator means for comparing the actual-drops/minute achieved during every time-period with said optimal-drops/minute and for varying the solenoid control means to be utilized for the next time-period, whereby the actual-drops/minute achieved for subsequent time-periods tends to converge in value toward said optimal-drops/minute.

7. The controllable oiler of claim 6 wherein the electronic detection means takes the form of an infrared-transmitter and an infrared-receiver having common constant elevations and electronically extending horizontally across the said finite-gap.

8. The controllable oiler of claim 7 wherein the infrared-transmitter, the infrared-receiver, and an infrared filtering device are all attached to and extend below a constant elevation said outlet-line.

* * * * *